(12) United States Patent
Ohta (10) Patent No.: US 10,081,301 B2
(45) Date of Patent: Sep. 25, 2018

(54) LIGHTING CIRCUIT AND VEHICULAR TURN SIGNAL LAMP

(71) Applicant: KOITO MANUFACTURING CO., LTD., Tokyo (JP)

(72) Inventor: Shinji Ohta, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/392,675

(22) Filed: Dec. 28, 2016

(65) Prior Publication Data

US 2017/0182941 A1 Jun. 29, 2017

(30) Foreign Application Priority Data

Dec. 28, 2015 (JP) .................................. 2015-255865

(51) Int. Cl.
- *H05B 37/02* (2006.01)
- *B60Q 11/00* (2006.01)
- *B60Q 1/38* (2006.01)
- *H05B 33/08* (2006.01)

(52) U.S. Cl.
CPC .............. *B60Q 11/007* (2013.01); *B60Q 1/38* (2013.01); *H05B 33/083* (2013.01); *H05B 33/089* (2013.01); *H05B 33/0827* (2013.01); *H05B 33/0845* (2013.01)

(58) Field of Classification Search
CPC .............. H05B 33/0827; H05B 33/083; H05B 33/0845; H05B 33/089; B06Q 11/007; B06Q 1/38
USPC .............................................. 315/77; 325/77
See application file for complete search history.

(56) References Cited

U.S. PATENT DOCUMENTS

| 7,777,495 B2 * | 8/2010 | Mannerfelt | B60Q 1/305 324/414 |
| 2010/0327766 A1 * | 12/2010 | Recker | H02J 9/02 315/291 |
| 2013/0162162 A1 * | 6/2013 | May | H05B 37/02 315/224 |

(Continued)

FOREIGN PATENT DOCUMENTS

| CN | 1822733 A | 8/2006 |
| CN | 102238779 A | 11/2011 |

(Continued)

OTHER PUBLICATIONS

Office Action issued in Chinese Application No. 201611240010.8, dated Apr. 2, 2018 (19 pages).

(Continued)

*Primary Examiner* — Don Le
(74) *Attorney, Agent, or Firm* — Osha Liang LLP (57) ABSTRACT

A lighting circuit for blinking a light-emitting unit having plural light sources is equipped with an abnormality detection unit which generates abnormality information when detecting an abnormality in even one of the plural light sources, and a holding circuit which holds the abnormality information during a period when the lighting circuit is supplied with a blinking signal. The lighting circuit supplies a drive current(s) to the plural light sources according to the blinking signal and stops supplying a drive current(s) to all of the plural light sources according to the abnormality information being held by the holding circuit.

5 Claims, 5 Drawing Sheets

(56) References Cited

U.S. PATENT DOCUMENTS

| | | | |
|---|---|---|---|
| 2014/0091915 A1* | 4/2014 | Rodriguez Barros | B60R 1/082 340/435 |
| 2014/0168433 A1* | 6/2014 | Frank | H04N 5/33 348/143 |
| 2014/0253306 A1* | 9/2014 | Gillespey | B60Q 1/00 340/425.5 |

FOREIGN PATENT DOCUMENTS

| | | |
|---|---|---|
| CN | 104816668 A | 8/2015 |
| CN | 104955214 A | 9/2015 |
| EP | 2674327 A1 | 12/2013 |
| JP | 2003-219550 A | 7/2003 |
| JP | 2009-184592 A | 8/2009 |
| JP | 2015-081000 A | 4/2015 |
| JP | 2015-145224 A | 8/2015 |
| KR | 100859562 B1 | 9/2008 |

OTHER PUBLICATIONS

Preliminary Search Report issued in corresponding French Application No. 1663449, dated Nov. 27, 2017 (10 pages).

* cited by examiner

LIGHTING CIRCUIT AND VEHICULAR TURN SIGNAL LAMP

CROSS-REFERENCE TO RELATED APPLICATION

The present application claims the benefit of priority of Japanese Patent Application No. 2015-255865, filed on Dec. 28, 2015, the disclosure of which is incorporated herein by reference.

TECHNICAL FIELD

The present invention relates to a lamp lighting circuit and a vehicular turn signal lamp.

BACKGROUND ART

Among vehicular lamps are turn signal lamps (hereinafter referred to as turn lamps) for notifying nearby drivers etc. of an upcoming left or right turn of the self vehicle. And turn signal lamps include ones using plural light sources such as LEDs (light-emitting diodes).

For example, JP-A-2015-81000 discloses a configuration in which plural systems of LED groups are connected to each other in parallel. JP-A-2015-145224 discloses a sequential lighting type turn lamp in which plural light source are turned on sequentially.

Incidentally, for vehicular lamps to be permitted use in a certain country, their lighting operation is required to satisfy various related laws of that country. For example, to satisfy the related laws established in North America, a turn lamp should be turned off as a whole even when only part of its plural light sources have suffered a disconnection failure. To this end, it is necessary to employ a configuration that ensures execution of a necessary control by detecting a disconnection in each light source before turning-on of a turn lamp. However, this raises a problem that a control circuit is made complex and increased in size and cost.

To perform sequential lighting using plural light sources in a turn lamp, disconnections of part of the light sources an event that a sequential lighting operation is terminated halfway or the part of the light sources do not light. Such an imperfect sequential lighting operation looks poor and lowers the product value and may disable the turn signal function. Thus, it is desirable to turn off the turn lamp as a whole even when only part of the light sources have suffered a disconnection failure. However, as in the above-described case, this raises a problem that a control circuit is made complex and increased in size and cost.

SUMMARY OF THE INVENTION

The present invention has been made in the above circumstances, and an object of the present invention is therefore to realize a lighting circuit that is simple in circuit configuration and can turn off a turn lamp as a whole at the occurrence of an abnormality such as disconnections of part of light sources.

Means for Solving the Problems

The present invention provides a lighting circuit for blinking a light-emitting unit having plural light sources, comprising an abnormality detection unit which generates abnormality information when detecting an abnormality in even one of the plural light sources, and a holding circuit which holds the abnormality information during a period when the lighting circuit is supplied with a blinking signal. The lighting circuit supplies a drive current or currents to the plural light sources according to the blinking signal and stops supplying a drive current or currents to all of the plural light sources according to the abnormality information being held by the holding circuit.

If an abnormality such as a disconnection has occurred in even one of the plural light sources (light source elements such as LEDs) that constitute the light-emitting unit, ail of the plural light sources are prevented from being turned on according to abnormality information being held by the holding circuit.

The above lighting circuit may be such that the abnormality detection unit detects a disconnection in each of the plural light source systems, each of which includes the plural light sources that are connected in series, that are connected to each other in parallel in the light-emitting unit, and generates abnormality information when detecting a disconnection abnormality in even one of the plural light source systems.

The term "light source system" means one light source or plural, series-connected light sources that turn off as a result of a disconnection of the one light source or one of the light sources.

Even if part of the parallel-connected light source systems suffer a disconnection, the other, normal light source systems can light. However, this lighting circuit prevents the other, normal light source systems from being turned on.

The above lighting circuit may further comprise a sequential lighting control unit which supplies a drive current or currents to the plural light source systems progressively in a period when to blink the light-emitting unit.

This lighting circuit is directed to a case that the plural light source systems are lit sequentially, that is, sequential lighting is performed. In this case, if part of the light source systems suffer a disconnection, each sequence of a sequential lighting operation is terminated halfway or part of the light source systems do not light. It is therefore appropriate to prevent the other, normal light source systems from being turned on.

The above lighting circuit may be such as to blink the light-emitting unit in synchronism with the blinking signal. In this case, the lighting circuit operates according to the blinking signal which indicates a blinking cycle.

The present invention also provides a vehicular turn signal lamp comprising a turn signal light-emitting unit having plural light source systems; and any of the above lighting circuits.

With this configuration, the vehicular turn signal lamp is given a function that all of the light source systems are prevented from being turned on when an abnormality is detected in part of the light source systems.

The present invention can realize a lighting circuit that is simple in circuit configuration and can turn off a lighting unit as a whole at the occurrence of an abnormality such as disconnections of part of light sources. When used as a lighting circuit of a turn signal lamp, this lighting circuit is suitable for miniaturization of a circuit board and cost reduction.

DETAILED DESCRIPTION

Embodiment 1

A vehicular lamp 1 according to a first embodiment will be described with reference to the drawings. The first embodiment is directed to a turn lamp in which plural systems of light sources are connected to each other in parallel and all of the light sources are prevented from being turned on when part of the light sources have suffered a disconnection. Each of the light source system connected to each other in parallel means one light source or plural, series-connected light sources.

Each of the embodiments are directed to the case that the light sources are LEDs. However, in the embodiments, the light sources are not limited to LEDs and may be other semiconductor light-emitting devices such as laser diodes or organic EL devices or bulb light sources such as incandescent lamps, halogen lamps, discharge lamps, or neon lamps.

Figure 1:
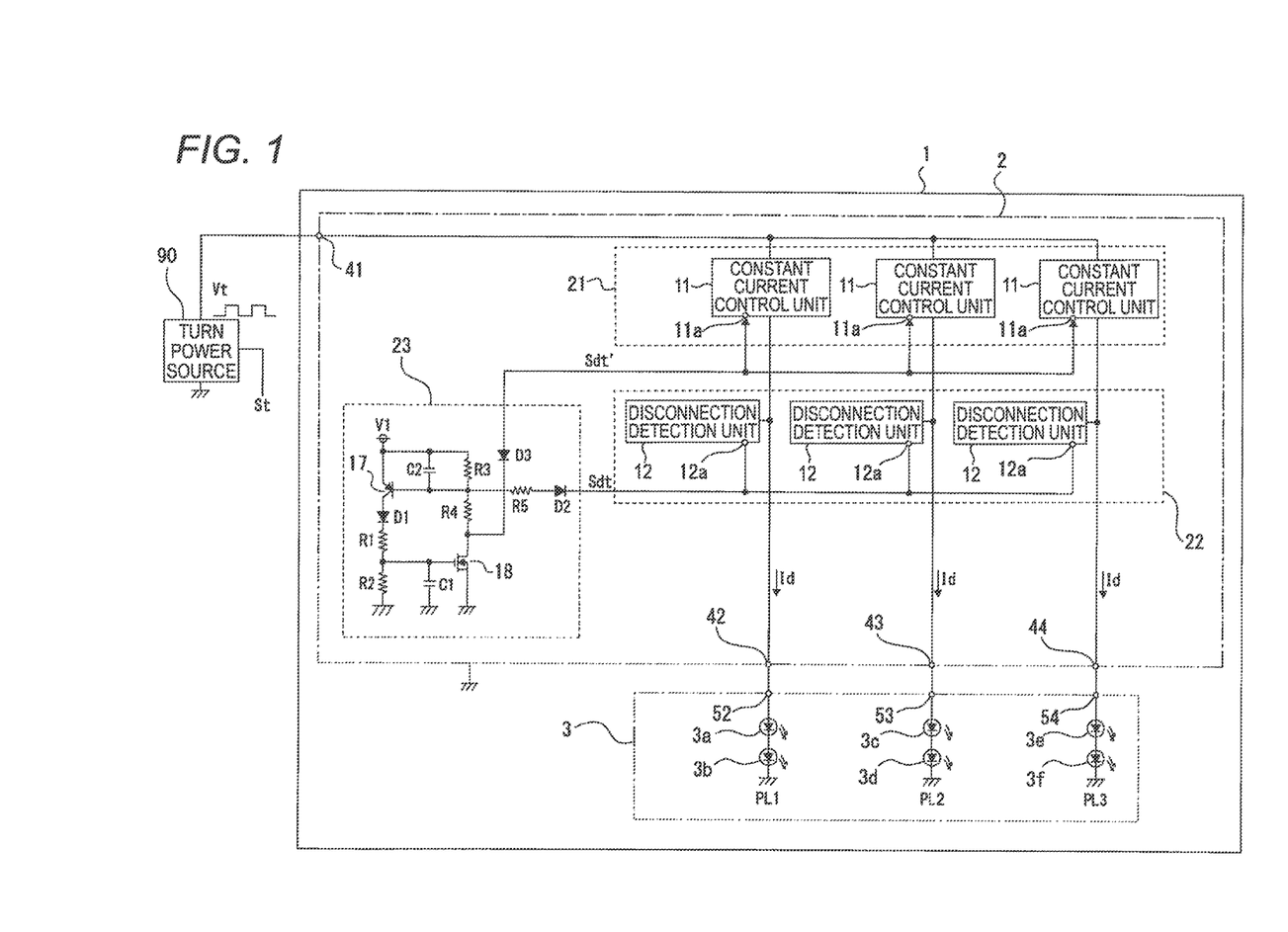
FIG. 1 is a block diagram showing the configuration of a vehicular lamp according to a first embodiment of the present invention.

FIG. 1 shows the configuration of the vehicular lamp 1 according to a first embodiment. The vehicular lamp 1, which is a turn lamp, is equipped with a lighting circuit 2 and a turn signal light-emitting unit 3 (hereinafter referred to as a "light-emitting unit 3"). For example, the lighting circuit 2 is composed of various electronic components mounted on a lighting circuit board. The light-emitting unit 3 includes plural light sources (light-emitting elements) arranged on a light source board.

In the embodiment, the light-emitting unit 3 has three light source systems PL1, PL2, and PL3 which are connected to each other in parallel. The term "light source system" means one light source or plural, series-connected light sources that turn off as a result of a disconnection of the one light source or one of the light sources.

In the light source system PL1, a series connection of LEDs 3a and 3b exist between a terminal 52 and the ground. In the light source system PL2, a series connection of LEDs 3c and 3d exist between a terminal 53 and the ground. In the light source system PL3, a series connection of LEDs 3e and 3f exist between a terminal 54 and the ground. The light-emitting unit 3 having three light source systems is just an example, it may have two light source systems or four or more light source systems.

The lighting circuit 2 receives power from a turn power source 90. The turn power source 90 is provided on the vehicle side, and is a unit that supplies a turn power source voltage to the lighting circuit 2. The turn power source 90 outputs a pulse power source voltage (turn power source voltage) Vt for turn signal blinking during a turn switch on-period that is indicated by a turn switch signal St.

The lighting circuit 2 is equipped with a drive unit 21, an abnormality detection unit 22, and a holding circuit 23. The drive unit 21 is equipped with three constant current control units 11 which correspond to the three respective light source systems PL1, PL2, and PL3. Each constant current control unit 11 includes a DC-DC converter such as a switching regulator and a regulation control circuit therefor. Each constant current control unit 11 generates an output voltage by performing voltage conversion on a turn power source voltage Vt and causes a drive current Id corresponding to the output voltage to flow through the LEDs of the associated light source system.

The drive currents Id are supplied from the constant current control units 11 to the light source systems PL1, PL2, and PL3 via terminals 42, 43, 44 of the lighting circuit 2 and terminals 52, 53, and 54 of the light-emitting unit 3, respectively.

Abnormality information Sdt' may be input to terminals 11a of the respective constant current control units 11. For example, each constant current control unit 11 recognizes an L-level (low level) voltage occurring at its terminal 11a as abnormality information Sdt'. Upon receiving abnormality information Sdt', each constant current control unit 11 stops a constant current control and thereby stops supplying a drive current Id to the light-emitting unit 3.

The light-emitting unit 3 is equipped with three disconnection detection units 12 which correspond to the three respective light source systems PLA, and PL3. Each disconnection detection unit 12 detects a disconnection abnormality, that is, a state that no drive current Id flows in an Ft-level period of a pulse turn power source voltage Vt periods when a drive current Id should flow through the light-emitting unit 3). To this end, each disconnection detection unit 12 monitors, for example, the output voltage of the corresponding constant current control unit 11.

Each disconnection detection unit 12 outputs abnormality detection information Sdt at its output terminal 12a. For example, upon detecting occurrence of an abnormality in the corresponding light source system PL1, PL2, or PL3, a disconnection detection unit 12 renders the voltage of the terminal 12a at an L level.

The holding circuit 23 holds (stores) the signal level of abnormality detection information Sdt generated by a disconnection detection unit 12 of the abnormality detection unit 22 so that it is maintained at least during a blinking instruction period for the light-emitting unit 3 (i.e., a period when the drive unit 21 receives a pulse turn power source voltage Vt), and supplies resulting abnormality information Sdt' to all of the constant current control units 11 of the drive unit 21.

To realize the above operation, for example, as shown in FIG. 1, the holding circuit 23 is composed of a pnp bipolar transistor 17, a MOSFET (metal-oxide-semiconductor field-effect transistor) 18 (hereinafter referred to as an FET 18), resistors R1-R5, capacitors C1 and C2, and diodes D1-D3.

The emitter of the bipolar transistor 17 is connected to a line having a voltage V 1. A parallel connection of the capacitor C2 and the resistor R3 is connected between the emitter and the base of the bipolar transistor 17. The anode of the diode D1 is connected to the collector of the bipolar transistor 17, and the cathode of the diode D1 is connected to the gate of the FET 18 via the resistor R1. The resistor R2 is connected between the gate of the FET 18 and the ground, and the capacitor C1 is connected to the resistor R2 in parallel. The drain of the FET 18 is connected to the base of the bipolar transistor 17 via the resistor R4, and the source of the FET 18 is wounded.

The base of the bipolar transistor 17 is connected to the anode of the diode D2 via the resistor R5, and the cathode of the diode D2 is connected to the terminals 12a of all of the disconnection detection units 12 of the abnormality detection unit 22. The drain of the FET 18 is connected to the cathode of the diode D3, and the anode of the diode D3 is connected to the terminal 11a of all of the constant current control units 11 of the drive unit 21.

The holding circuit 23 operates as follows. If at least one of the plural disconnection detection units 12 of the abnormality detection unit 22 detects a disconnection, the terminal 12a of this disconnection detection unit 12 is rendered at the L level. In response, a base current flows through the bipolar transistor 17 and the bipolar transistor 17 is turned on. Thus, a charging current flows into the capacitor C1 via the path of the diode D1 and he resistor R1. As the charging of the capacitor C1 progresses, the gate voltage of the FET 18 exceeds its threshold voltage at a certain time point and the FET 18 is turned on. As a result, a current flows along the path of the diode D3 and the FET 18, whereby the terminals 11a of the constant current control units 11 are rendered at the L level. This state is maintained until the gate voltage of the FET 18 is lowered by discharge of the capacitor C1 and the FET 18 is turned off after returning, to the H level, of the voltage of the terminal 12a of the disconnection detection unit 12 that detected the disconnection.

That is, if even one disconnection detection unit 12 generates abnormality detection information Sdt (i.e., the voltage of the terminal 12a is rendered at the L level), abnormality information Sdt' obtained by holding the signal level of the abnormality detection information Sdt is given to all of the constant current control units 11 of the drive unit 21. In response, all of the constant current control units 11 of the drive unit 21 stop supplying drive currents Id to the light-emitting unit 3.

Figures 2A, 2B:
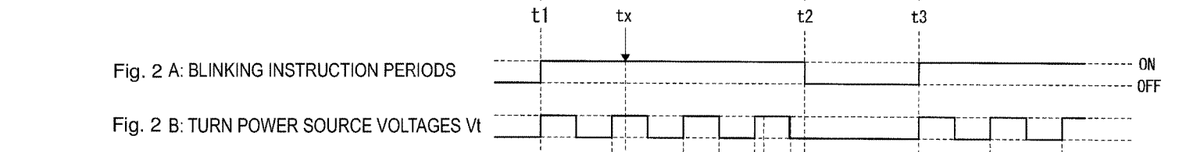
FIGS. 2A-2I are time charts illustrating how the vehicular lamp according to the first embodiment operates.

How the vehicular lamp 1 according to the first embodiment operates will be described with reference to FIGS. 2A-2I using comparative examples. FIG. 2A shows blinking instruction periods Tt that are determined by a turn switch signal St. The turn switch signal St is a signal that specifies blinking periods of the vehicular lamp 1 which is a turn lamp, and is supplied to the turn power source 90 in response to a manipulation of a turn lever or a hazard switch by a driver. In FIGS. 2A-2I, the blinking instruction periods Tt during which the turn lamp should be blinked are the period from time t1 to t2 and the period after time t3.

FIG. 2B shows turn power source voltages Vt which are supplied from the turn power source 90 to the lighting circuit 2. The turn power source 90 outputs, in each blinking instruction period. It, a turn power source voltage Vt that consists of pulses whose cycle is equal to a blinking cycle and that have, for example, a duty ratio 50%.

Figure 2C:
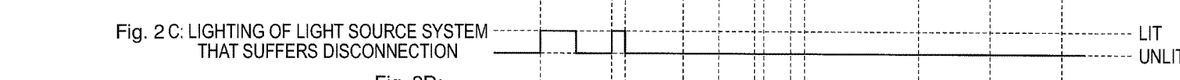

Assume that a disconnection occurs in one of the light source systems PL1, PL2, and PL3 at time tx. FIG. 2C shows a pulse waveform indicating on/off states of the light source system where the disconnection occurs. This light source system blinks according to the turn power source voltage Vt until time tx. After the occurrence of the disconnection at time tx, naturally this light source system is kept off irrespective of the value of the turn power source voltage Vt.

Lighting modes in which the other light source systems, that is, the normal light source systems without a disconnection, of the embodiment and comparative examples operate in this situation will be described below with reference to FIGS. 2D, 2E, 2H, and 2I. FIGS. 2D, 2E, 2H, and 2I also show pulse waveforms indicating on/off states.

Figure 2D:
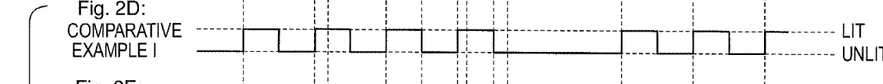

First, FIG. 2D shows a lighting mode of a case that no particular measure is taken for detection of a disconnection (comparative example I). For example, this is a case that the plural light source systems PL1, PL2, and PL3 are connected to each other in parallel as shown in FIG. 1 but neither the abnormality detection unit 22 not the holding circuit 23 is provided.

Since the light source systems PL1, PL2, and PL3 are parallel with each other, even if one light source system suffers a disconnection, drive currents Id continue to flow through the other, normal light source systems. Thus, as shown in FIG. 2D, the normal light source systems continue to blink in the blinking instruction period Tt. However, this operation does not satisfy the related laws established in North America.

Figure 2E:
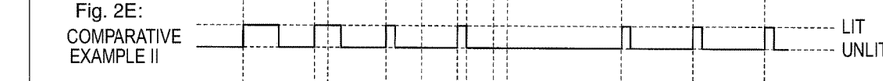
Figure 2F:
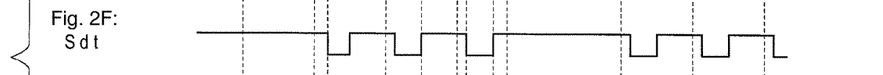

FIG. 2E shows comparative example II in which none of the light source systems PL1-PL3 are lit upon detection of a disconnection in a certain light source system and no function similar to the function of the holding circuit 23 employed in the embodiment is provided. The disconnection detection unit 12 corresponding to the light source system where the disconnection has occurred outputs abnormality detection information Sdt as shown in FIG. 2F. This lighting mode can be considered a mode in which this abnormality detection information Sdt is supplied to all of the constant current control units 11 as it is.

This causes the normal light source systems to operate in the lighting mode shown in FIG. 2E. That is, they are turned off with a short time lag after the disconnection is detected at time tx. In the remaining part of the blinking instruction period Tt, the disconnection is detected in the same light source system, the constant current control unit 11 receive abnormality detection information Sdt, and none of the light source systems PL1-PL3 are lit. However, the normal light source systems are lit instantaneously in the time lag period. In this manner, in the normal light source systems, instantaneous light emission occurs repeatedly at the blinking cycle in each blinking instruction period Tt. AS such, comparative example II does not satisfy the related laws established in North America, either.

Figures 2G, 2H, 2I:
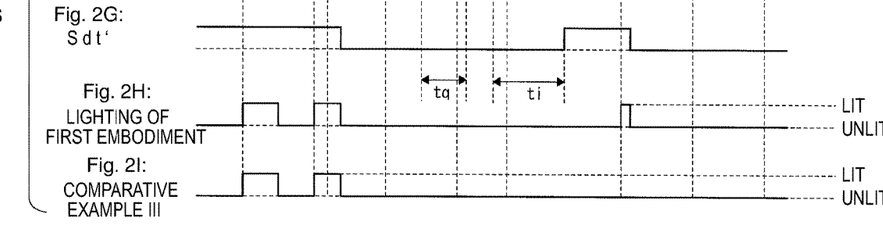

FIG. 2I shows comparative example III in which all of the light source systems PL1-PL3 are kept off after detection of a disconnection in a certain light source system.

For example, occurrence/non-occurrence of a disconnection is detected in every light source system before a start of lighting (e.g., at a rise of a turn power source voltage Vt). If a disconnection failure is detected in even one light source system, all of the light source systems PL1-PL3 are prevented from being turned on. This operation satisfies the related laws. However, to implement this manner of detection of a disconnection, a complicated control circuit and a large-size lighting circuit are necessary and cost increase is inevitable.

In view of the above, in the embodiment, with the configuration shown in FIG. 1, each normal light source system operates in a lighting mode shown in FIG. 2H.

Assume that a disconnection occurs in the light source system PL1 at time tx. As a result, as shown in FIG. 2F, L-level abnormality detection information Sdt is produced at time tx. Since the disconnection detection unit 12 renders the voltage of the terminal 12a at the L-level by detecting no drive current Id flows in the period during which a drive current Id should be supplied (i.e., the on-period of the blinking instruction period Tt), the abnormality detection information Sdt continues to appear as a L-level voltage in the on-period with a short time lag.

This abnormality detection information Sdt is kept at the L-level for a certain length of time because of the above-described operation of the holding circuit 23, and resulting abnormality information Sdt' shown in FIG. 2G is supplied to the constant current control units 11.

While the L-level abnormality information Sdt' continues, the constant current control unit 11 corresponding to the normal light source systems PL2 and PL3 perform a current output stop control, whereby the light source systems PL2 and PL3 are kept off.

As a result, when a disconnection occurs in the light source system PL1, the normal light source systems PL2 and PL3 operate in the lighting mode shown in FIG. 2H. Thus, after the light source systems PL2 and PL3 are turned off with the short time lag from time tx, they are kept off until the end of the blinking instruction period Tt with no instantaneous light emission.

In the next blinking instruction period Tt starting from time t3, the normal light source systems PL2 and PL3 are lit for a short time (instantaneously) because drive currents Id flow through them until the abnormality detection information Sdt is first rendered at the L level. However, the light source systems PL2 and PL3 are kept off thereafter, that is, during the remaining part of the blinking instruction period Tt. Thus, an operation is realized that none of the light source systems PL1, PL2, and PL3 are lit after detection of a disconnection in even part of them.

To realize the above operation, the holding circuit 23 generates abnormality information Sdt' by holding the signal level of abnormality detection information Sdt generated by a disconnection detection unit 12 of the abnormality detection unit 22 so that it is maintained at least during a blinking instruction period Tt. In the example of FIG. 2H, it is assumed that the time constant circuit (C1 and R2) so that the signal level of abnormality detection information Sdt is held for a time ti. It suffices that this time constant circuit be designed so that the on state of the FET 18 can be maintained at least for a period (period tq) that is the L-level period of the turn power source voltage Vt plus the time lag from detection of a disconnection to a stop of a drive current Id, after switching of abnormality detection information Sdt from the L level to the H level.

Embodiment 2

Figure 3:
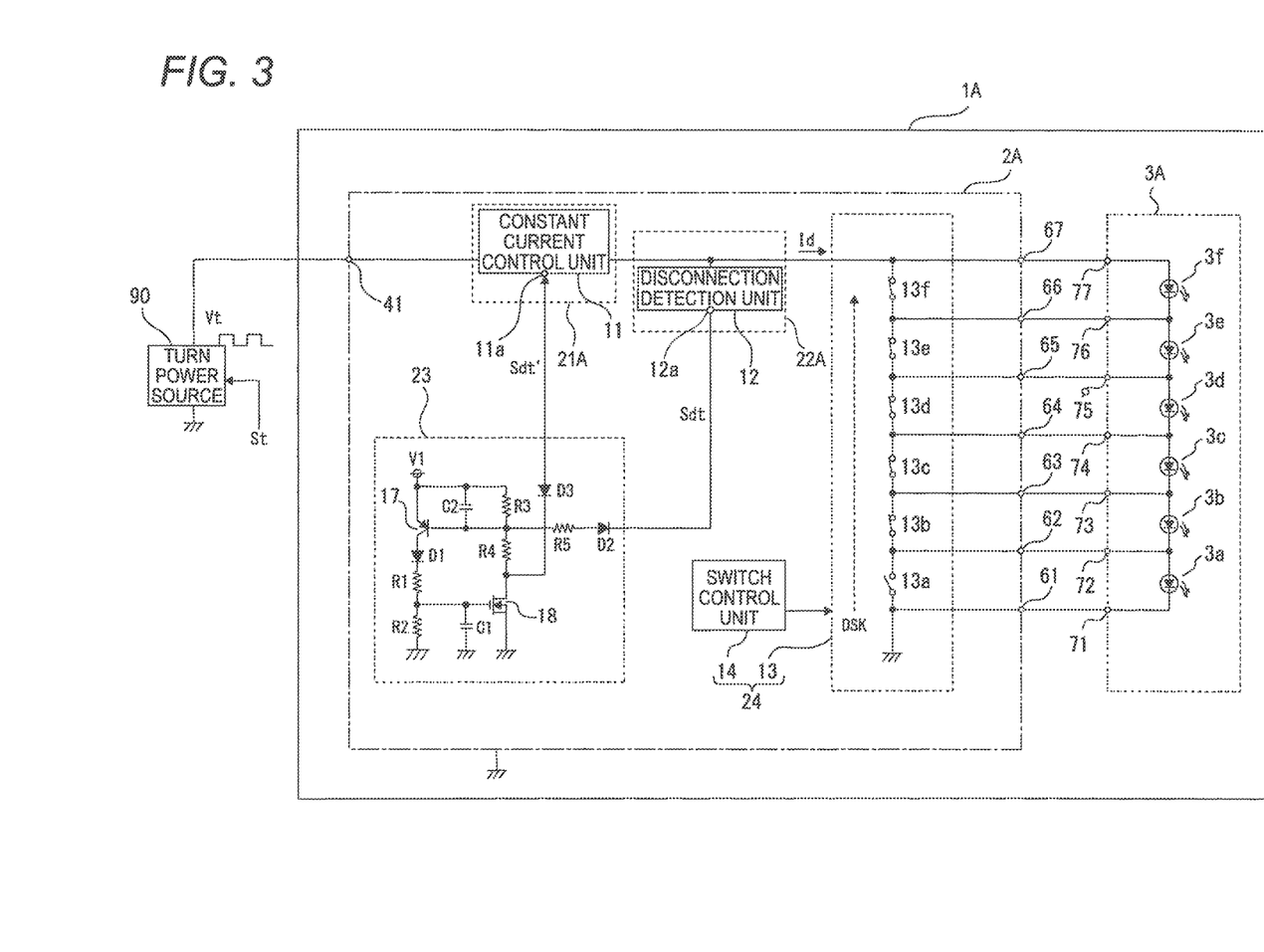
FIG. 3 is a block diagram showing the configuration of a vehicular lamp according to a second embodiment of the present invention.

FIG. 3 shows the configuration of a vehicular lamp 1A according to a second embodiment. Components having the same ones in FIG. 1 are given the same reference symbols as the latter, and descriptions therefor will be omitted. The vehicular lamp 1A shown in FIG. 3 is a turn lamp in which sequential lighting is performed.

In this embodiment, a light-emitting unit 3A is a series connection of six LEDs $3a$-$3f$. When all of the LEDs $3a$-$3f$ are lit, a drive current Id flows from a drive unit 21A to the LEDs $3f$, $3e$, $3d$, $3c$, $3b$, and $3a$ in this order.

Since the LEDs $3a$-$3f$ are connected to each other in series and are of one system, a drive circuit 21A has only one constant current control unit 11. An abnormality detection unit 22A detects a disconnection abnormality in the LEDs $3a$-$3f$. Since the LEDs $3a$-$3f$ are connected to each other in series and are of one system, the abnormality detection unit 22A has only one disconnection detection unit 12 for monitoring the output of the constant current control unit 11.

The holding circuit 23 is has the same configuration as in the first embodiment. The holding circuit 23 holds, for a prescribed time, the signal level of abnormality detection information Sdt appearing at the terminal $12a$ of the disconnection detection unit 12 of the abnormality detection unit 22A, and supplies resulting abnormality information Sdt' the terminal $11a$ of the constant current control unit 11. The constant current control unit 11 stops the output of a drive current Id in response to the abnormality information Sdt'.

Terminals 61-67 are terminals provided on the side of the lighting circuit 2A and terminals 71-77 are terminals provided on the side of the light-emitting unit 3A. The terminals 61 and 71 are connected to each other, the terminals 62 and 72 are connected to each other, the terminals 63 and 73 are connected to each other, the terminals 64 and 74 are connected to each other, the terminals 65 and 75 are connected to each other, the terminals 66 and 76 are connected to each other, and the terminals 67 and 77 are connected to each other.

The cathode of the LED $3a$ and the terminals 61 and 71 are grounded. The anode of the LED $3a$ and the cathode of the LED $3b$ are connected to the terminal 72, the anode of the LED $3b$ and the cathode of the LED $3e$ are connected to the terminal 73, the anode of the LED $3c$ and the cathode of the LED $3d$ are connected to the terminal 74, the anode of the LED $3d$ and the cathode of the LED $3e$ are connected to the terminal 75, and the anode of the LED $3e$ and the cathode of the LED $3f$ are connected to the terminal 76. The anode of the LED $3f$ is connected to the terminal 77.

The lighting circuit 2A is equipped with a sequential lighting control unit 24 having a bypass switch unit 13 and a switch control unit 14.

In the bypass switch unit 13, switches $13a$-$13f$ each of which uses a MOSFET, for example, are connected to each other in series. The switch $13a$ is connected between the terminals 61 and 62, the switch $13b$ is connected between the terminals 62 and 63, the switch $13c$ is connected between the terminals 63 and 64, the switch $13d$ is connected between the terminals 64 and 65, the switch $13e$ is connected between the terminals 65 and 66, and the switch $13f$ is connected between the terminals 66 and 67. Connected in this manner, the switches $13a$-$13f$ constitute bypasses of the LEDs $3a$-$3f$, respectively.

The switch control unit 14 controls the switches $13a$-$13f$ during H-level periods of each pulse turn power source voltage Vt which lasts a blinking instruction period Tt (see FIG. 4A) of the turn lamp. For example, the switch control unit 14 controls the switches $13a$-$13f$ in the following manner (periods (1)-(6)) according to timing signals that are generated on the basis of each pulse of each pulse turn power source voltage Vt, in the initial state in which none of the LEDs $3a$-$3f$ are lit, the switch control unit 14 turns on all of the switches $13a$-$13f$.
(1) Turns off the switch $13a$; the LED $3a$ is lit.
(2) Turns off the switch $13b$; the LEDs $3a$ and $3b$ are lit.
(3) Turns off the switch $13c$; the LEDs $3a$-$3c$ are lit.
(4) Turns off the switch $13d$; the LEDs $3a$-$3d$ are lit.
(5) Turns off the switch $13e$; the LEDs $3a$-$3e$ are lit.
(6) Turns off the switch $13f$; all of the LEDs $3a$-$3f$ are lit.

As described above, the switches $13a$-$13f$ are turned off in order indicated by arrow DSK in each period in which the constant current control unit 11 is supplied with the H-level voltage of a turn power source voltage Vt and thereby outputs a drive current Id, whereby sequential lighting is realized.

In the above configuration, if even one LED suffers a disconnection failure, each sequence of a sequential lighting operation is terminated halfway. For example, assume that a disconnection has occurred in the LED $3c$. In this case, a drive current Id flows during periods (1) and (2) because the switch $13c$ corresponding to the LED $3c$ is on. However, a drive current Id does not flow and the light-emitting unit 3 is not lit as a whole during period (3) onward. Each sequence of the sequential turn signal lighting operation is terminated halfway and the sequential turn signal lighting operation looks very poor.

In view of the above, in the embodiment, abnormality information Sdt' is supplied to the constant current control unit 11 from the holding circuit 23 which processes abnormality detection information Sdt, whereby a poor-looking sequential lighting operation is avoided.

How the vehicular lamp 1A according to the second embodiment operates will be described with reference to FIGS. 4A-2F using a comparative example. Like FIGS. 2A and 2B, FIGS. 4A and 4B show blinking instruction periods Tt and turn power source voltages Vt, respectively.

Figure 4:
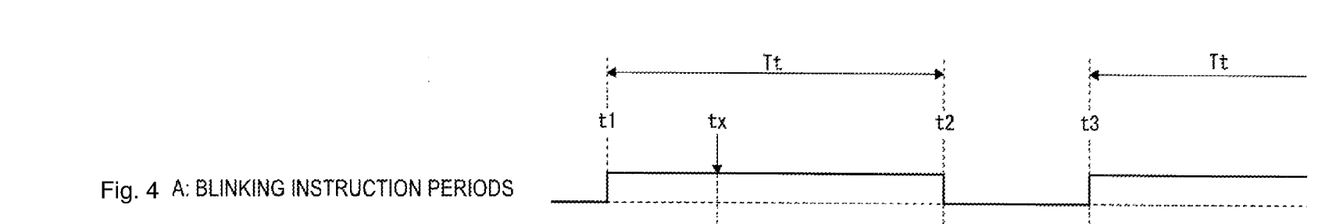
FIGS. 4A-4F are time charts illustrating how the vehicular lamp according to the second embodiment operates.

FIG. 4C shows a lighting mode of a case that each sequence of a sequential lighting operation is terminated halfway in the above-described manner (comparative example 1). Each of steps shown in FIG. 4C means additional turning-on of one LED. Assume that the LED 3c suffers a disconnection failure at time tx. After the occurrence of the disconnection failure, an operation that LEDs are lit only during periods (1) and (2) is repeated.

The same lighting mode as shown in FIG. 4C occurs in a case that abnormality detection information Sdt is supplied to the constant current control unit 11 as it is. This is because the abnormality detection information Sdt is kept at the L level during periods (3)-(6) and returns to the H level before a start of the next sequence.

In the embodiment, abnormality information Sdt' (see FIG. 4E) is generated by the holding circuit 23 by processing abnormality detection information Sdt (see FIG. 4D) and is supplied to the constant current control unit 11, whereby a lighting mode shown in FIG. 4F is realized. More specifically, assuming that the LED 3c suffers a disconnection at time tx, a sequential lighting operation is continued until time tx and none of the LEDs 3a-3f are lit thereafter because abnormality information Sdt' (see FIG. 4E) causes the constant current control unit 11 to stop the output of a drive current Id.

In the next blinking instruction period Tt (starting at time t3) after the detection of the disconnection, LEDs are lit normally in periods (1) and (2), that is, until the abnormality detection information Sdt is first rendered at the L level. However, since a disconnection failure is detected in period (3), none of the LEDs 3a-3f are lit during period (3) onward. Thus, the second embodiment is free of an event that an incomplete lighting sequence is repeated that is caused by disconnections of part of the LEDs 3a-3f.

Embodiment 3

Figure 5:
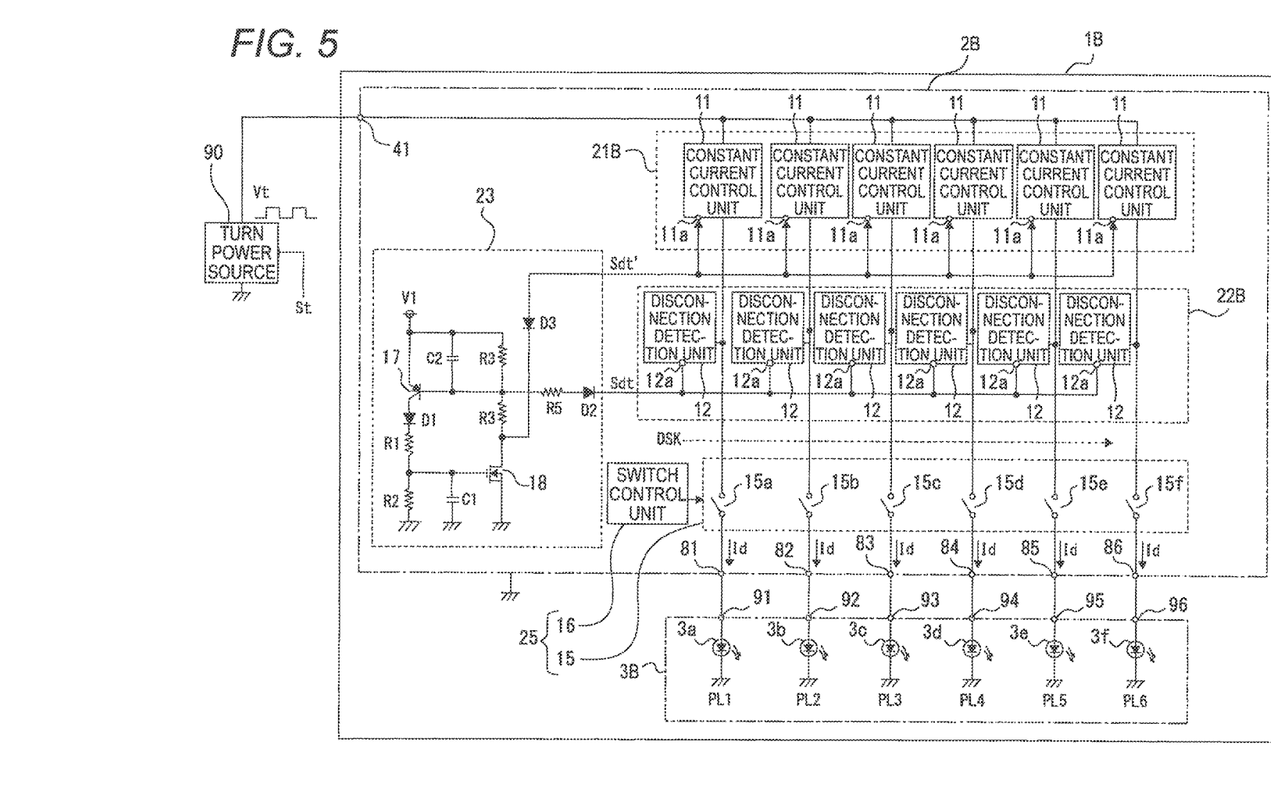
FIG. 5 is a block diagram showing the configuration of a vehicular lamp according to a third embodiment of the present invention.

FIG. 5 shows the configuration of a vehicular lamp 1B according to a third embodiment. The vehicular lamp 1B shown in FIG. 5 is a turn lamp in which sequential lighting is performed as in the second embodiment. In this embodiment, LEDs 3a-3f are connected to each other in parallel and constitute respective light source systems PL1-PL6.

A drive unit 21B is equipped with six constant current control units 11 which correspond to the six respective light source systems PL1-PL6. An abnormality detection unit 22B is equipped with six disconnection detection units 12 for monitoring the outputs of the constant current control units 11, respectively.

As in the first embodiment, if even one disconnection detection unit 12 detects a disconnection abnormality, the voltage of its terminal 12a is rendered at an L level and L-level abnormality detection information Sdt is input to a holding circuit 23. Abnormality information Sdt' obtained by holding the signal level of the abnormality detection information Sdt is supplied to all of the constant current control units 11.

Lighting-circuit-2B-side terminals 81-86 are provided so as to correspond to the respective light source systems PL1-PL6, and are connected to light-emitting unit 3B-side terminals 91-96 in one-to-one correspondence. The terminals 91-96 are connected to the anodes of the LEDs 3a-3f, respectively, and the cathodes of the LEDs 3a-3f are grounded.

The lighting circuit 28 is equipped with a sequential lighting control unit 25 having a sequence switch unit 15 and a switch control unit 16. The sequence switch unit is equipped with switches 15a-15f each of which uses a MOSFET, for example. The switch 15a turns on or off the supply of a drive current id to the light source system PL1. Likewise, the switches 15b-15f turn on or off the supply of drive currents Id to the light source systems PL2-PL6, respectively.

The switch control unit 16 performs a control of turning on the switches 15a-15f in order indicated by arrow DSK in each H-level period of each pulse turn power source voltage Vt (i.e., each blinking instruction period Tt of the turn lamp). As a result, sequential light is realized in such a manner that turning-on of the LED 3a, turning-on of the LEDs 3a and 3b, turning-on of the LEDs 3a-3c, turning-on of the LEDs 3a-3d, turning-on of the LEDs 3a-3e, and turning-on of all of the LEDs 3a-3f occur in this order.

When a sequential lighting operation is performed, if even one LED suffers a disconnection failure, each sequence of the sequential lighting operation lacks turning-on of the LED 3c; that is, turning-on of the LED 3a, turning-on of the LEDs 3a and 3b, turning-on of the LEDs 3a and 3b (the LED 3c not lit), turning-on of the LEDs 3a-3d excluding the LED 3c, turning-on of the LEDs 3a-3e excluding the LED 3c, and turning-on of the LEDs 3a-3f excluding the LED 3c occur in this order. This sequential turn signal lighting operation looks very poor.

In view of the above, in the embodiment, abnormality information Sdt' is supplied from the holding circuit 23 to all of the constant current control unit 11 so that none of the LEDs 3a-3f are lit if a disconnection failure is detected in even one of the LEDs 3a-3f. To this end, the disconnection detection units 12, the holding circuit 23, and the constant current control units 22 operate in the same manner as in the first embodiment. As a result, a poor-looking sequential lighting operation is avoided.

Summary

In each of the above-described first to third embodiments, the lighting circuit 2, 2A, or 2B causes the light-emitting unit 3, 3A, or 3B having the plural light sources (LEDs 3a-3f) to blink. The lighting circuit 2, 2A, or 2B is equipped with the abnormality detection unit 22, 22A or 22B for generating abnormality detection information Sdt when detecting an abnormality even in one of the plural light sources and the holding circuit 23 for holding the signal level of the abnormality detection information Sdt during each period when a blinking signal (turn power source voltage Vt) is supplied. Whereas a drive current(s) Id is supplied to the plural light sources according to the blinking signal (turn power source voltage Vt), every light source is prevented from being supplied with a drive current Id in response to abnormality information Sdt' being held by the holding circuit 23. More specifically, the drive unit 21, 21A, or 21B supplies a drive current(s) Id to the plural light sources, and stops supplying a drive current Id to every light source in response to abnormality information Sdt' being held by the holding circuit 23.

If an abnormality such as a disconnection is detected in even one light source of the light-emitting unit 3, 3A, or 3B consisting of the plural light sources (LEDs 3a-3f), all of the light sources are prevented from being turned on. To this end, the drive unit 21, 21A, or 21B prevents turning-on of all of the light sources in response to abnormality information Sdt' supplied from the holding circuit 23. In this manner, the lighting circuit 1, 1A, or 1B having a simple configuration can be realized which prevents normal light sources from being lit instantaneously in each turn-switch-on period (blinking period). This accelerates miniaturization and cost reduction of lighting circuits.

In the first and third embodiments, the abnormality detection unit 22 or 22B detects a disconnection in each of the plural light source systems (PL1-PL3 or PL1-PL6) and generates abnormality detection information Sdt if detecting a disconnection abnormality in even one light source system. Even if part of the plural light source systems which are connected to each other in parallel suffer a disconnection, the other light source systems can be lit. However, the other, normal light source systems are also prevented from being turned on. In this manner, an operation can be realized that all of the light source systems are prevented from being turned on when part of them suffer a disconnection. This operation satisfies, for example, the related lows established in North America.

In the second and third embodiment, the sequential lighting control unit 24 (bypass switch 13 and the switch control unit 14) or the sequential lighting control unit 25 (sequence switch unit 15 and the switch control unit 16) is provided which causes a drive current(s) Id to flow from the drive unit 21 or 21B to the plural light sources of the light-emitting unit 3 or 3B progressively in each blinking period.

Because of the sequential lighting configuration in which the plural light source systems are lit sequentially, if part of the plural light source systems suffer a disconnection, each sequence of a sequential lighting operation is terminated halfway or the part of the plural light source systems do not light. In view of this, the other, normal light source systems are also prevented from being turned on. In this manner, an event can be avoided that a poor-looking sequential lighting operation is performed when part of the light source systems have suffered a disconnection. The value of the product (lamp) can thus be increased.

In each embodiment, receiving turn power source voltages Vt which are a blinking signal, the lighting circuit 2, 2A, or 2B causes the light-emitting unit 3, 3A, or 3B to blink in synchronism with the blinking signal. More specifically, receiving pulse turn power source voltages Vt for turn signal blinking, the drive unit 21, 21A, or 21B supplies a drive current(s) Id to the light-emitting unit 3, 3A, or 3B on the basis of the pulse turn power source voltages Vt.

Since the blinking cycle is determined by the pulses of the turn power source voltages Vt, the lighting circuit 2, 2A, or 2B need not control the turn signal blinking cycle, which is preferable for simplification of the configuration of the lighting circuit 2, 2A, or 2B.

In each embodiment, the holding circuit 23 holds the signal level of abnormality information Sdt' to be supplied to the drive unit 21, 21A, or 21B by means of the time constant circuit. Since the signal level of abnormality information Sdt' is stored for a prescribed time using the time constant circuit, the holding circuit 23 can be made a simple circuit without using a timer, a counter, or the like.

Although the abnormality detection unit 22, 22A, or 22B has the disconnection detection units 12, it may be provided with short circuit detection units for detecting a short circuit abnormality in the light-emitting unit 3, 3A, or 3B instead of or in addition to the disconnection detection units 12. That is, it is also possible to form a lighting circuit that prevents all of the light sources from being turned on when part of the light sources are rendered unable to light due to a short circuit abnormality.

Although in each embodiment the lighting circuit 2, 2A, or 2B is supplied with a blinking signal (turn power source voltages Vt) from outside, a blinking signal may be generated by a signal generation circuit provided inside the lighting circuit 2, 2A, or 2B. In this case, the lighting circuit 2, 2A, or 2B may be configured in such a manner that it receives a lighting instruction signal (e.g., battery voltage) as a signal for blinking of the light-emitting unit 3, 3A, or 3B and the signal generation circuit generates a blinking signal only during periods when the lighting instruction signal is received.

The lighting circuit according to the present invention can be applied to not only vehicular turn signal lamps but also various other lamps that blink such as signal lamps installed beside roads and display lamps installed in buildings and vehicles.

The invention claimed is:

1. A lighting circuit for blinking a light-emitting unit having plural light sources, comprising:
   an abnormality detection unit which generates abnormality information when detecting an abnormality in even one of the plural light sources; and
   a holding circuit which holds the abnormality information during a period longer than one cycle of a blinking signal,
   wherein the lighting circuit supplies a drive current or currents to the plural light sources according to the blinking signal and stops supplying a drive current or currents to all of the plural light sources according to the abnormality information being held by the holding circuit.

2. The lighting circuit according to claim 1, wherein the abnormality detection unit detects a disconnection in each of the plural light source systems, each of which includes the plural light sources that are connected in series, that are connected to each other in parallel in the light-emitting unit, and generates abnormality information when detecting a disconnection abnormality in even one of the plural light source systems.

3. The lighting circuit according to claim 1, further comprising a sequential lighting control unit which supplies a drive current or currents to the plural light source systems progressively in a period when to blink the light-emitting unit.

4. The lighting circuit according to claim 1, wherein the lighting circuit blinks the light-emitting unit in synchronism with the blinking signal.

5. A vehicular turn signal lamp comprising:
   a turn signal light-emitting unit having plural light source systems; and
   the lighting circuit according to claim 1.

* * * * *